United States Patent [19]
Beugelsdyk et al.

[11] Patent Number: 6,047,614
[45] Date of Patent: Apr. 11, 2000

[54] DUAL ACTION BAIL AND LEVER LAWN MOWER CONTROL ASSEMBLY

[75] Inventors: Anthony F. Beugelsdyk; Michael A. Barnard, both of Wichita, Kans.

[73] Assignee: Wescon Products Company, Wichita, Kans.

[21] Appl. No.: 09/169,912

[22] Filed: Oct. 12, 1998

[51] Int. Cl.[7] ............................ F16C 1/10; A01D 69/00
[52] U.S. Cl. ............... 74/502.2; 74/500.5; 74/501.5 R; 74/489; 56/11.3; 56/10.8; 180/19.3
[58] Field of Search .................... 74/489, 502.2, 74/502.3, 501.5 R, 501.6, 502, 500.5; 123/397, 398, 400; 56/10.8, 11.3, 11.8; 180/19.3

[56] References Cited

U.S. PATENT DOCUMENTS

| | | |
|---|---|---|
| 4,363,206 | 12/1982 | Schmitt . |
| 4,466,232 | 8/1984 | Beugelsdyk et al. . |
| 4,466,308 | 8/1984 | Kester et al. . |
| 4,614,130 | 9/1986 | Heismann et al. ............... 74/501.5 R |
| 4,667,459 | 5/1987 | Scanland et al. ..................... 56/11.3 |
| 4,813,214 | 3/1989 | Barnard et al. . |
| 4,850,182 | 7/1989 | Barnard et al. . |
| 5,321,994 | 6/1994 | Barnard . |
| 5,467,583 | 11/1995 | Beugelsdyk et al. . |
| 5,657,669 | 8/1997 | Barnard . |
| 5,664,543 | 9/1997 | Taomo et al. ........................ 123/400 |
| 5,701,967 | 12/1997 | Barnard . |
| 5,784,868 | 7/1998 | Wadzinski et al. .................. 56/10.8 |

*Primary Examiner*—Vinh T. Luong
*Attorney, Agent, or Firm*—Hovey, Williams, Timmons & Collins

[57] ABSTRACT

A dual action bail and lever lawn mower control assembly is provided for operating the ground drive of a self-propelled walk-behind lawn mower. The control assembly includes a housing, a shift lever having an extended handle and a substantially circular body which is coupled to a control cable. A bail socket is pivotally received in the housing and is coupled to the bail. A blocking pawl is provided within the housing for engagement with the circular body of the shift lever and the bail socket. The bail socket includes a retainer which is provided with a lug and is spring loaded so that when the bail is pulled back, the spring imparts a rotational force to the retainer. When the lever is shifted to position a recess therein opposite the pawl, the retainer pivots the pawl to enter the recess and hold the lever in the engaged position until the bail is released and a return spring associated with the ground drive pulls on the cable, with the shift lever being then free to return to its original position. The configuration and design of the assembly components permits the assembly to be rearranged to either left hand or right hand mounting through the substitution of only a single part.

3 Claims, 3 Drawing Sheets

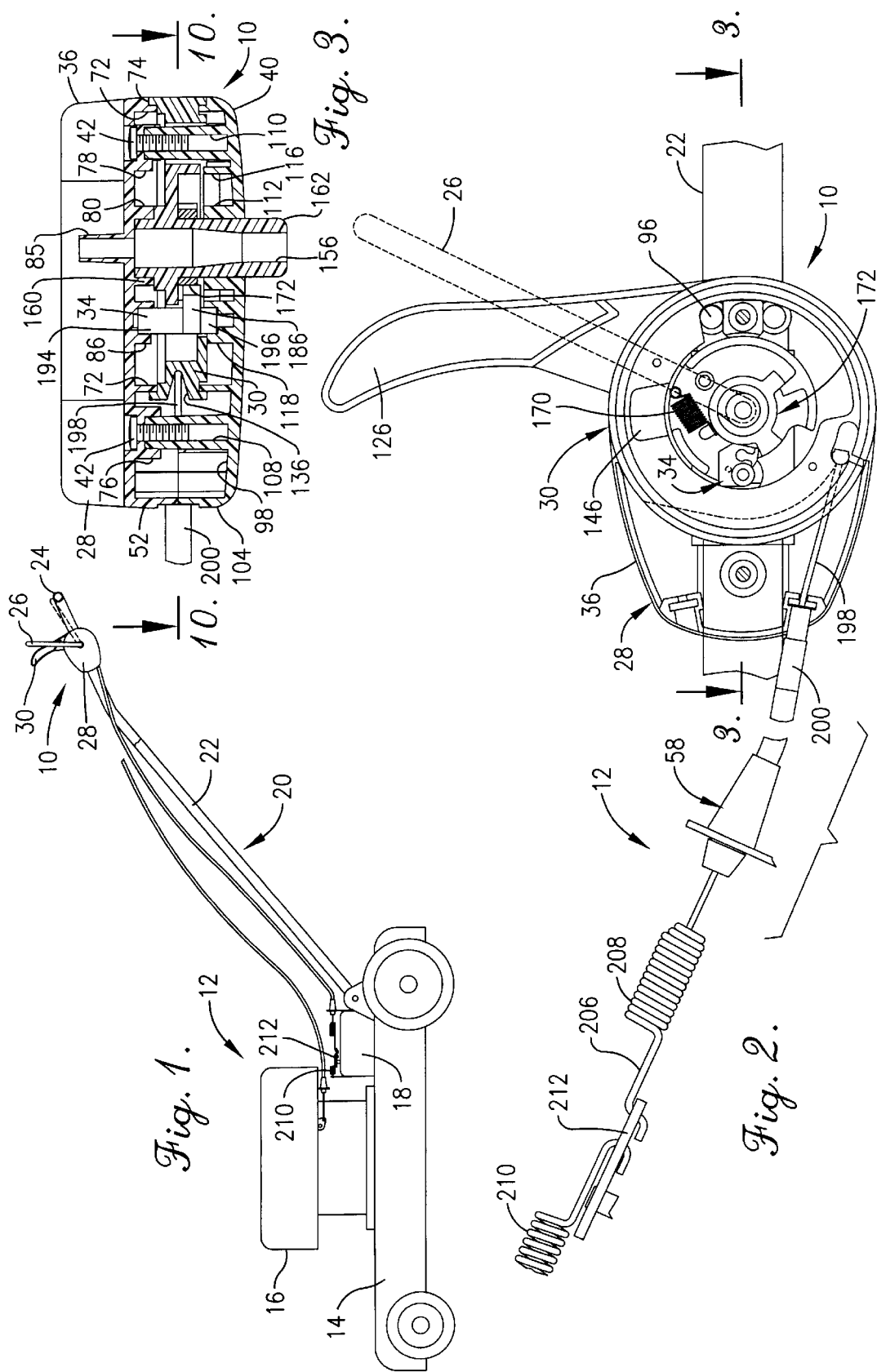

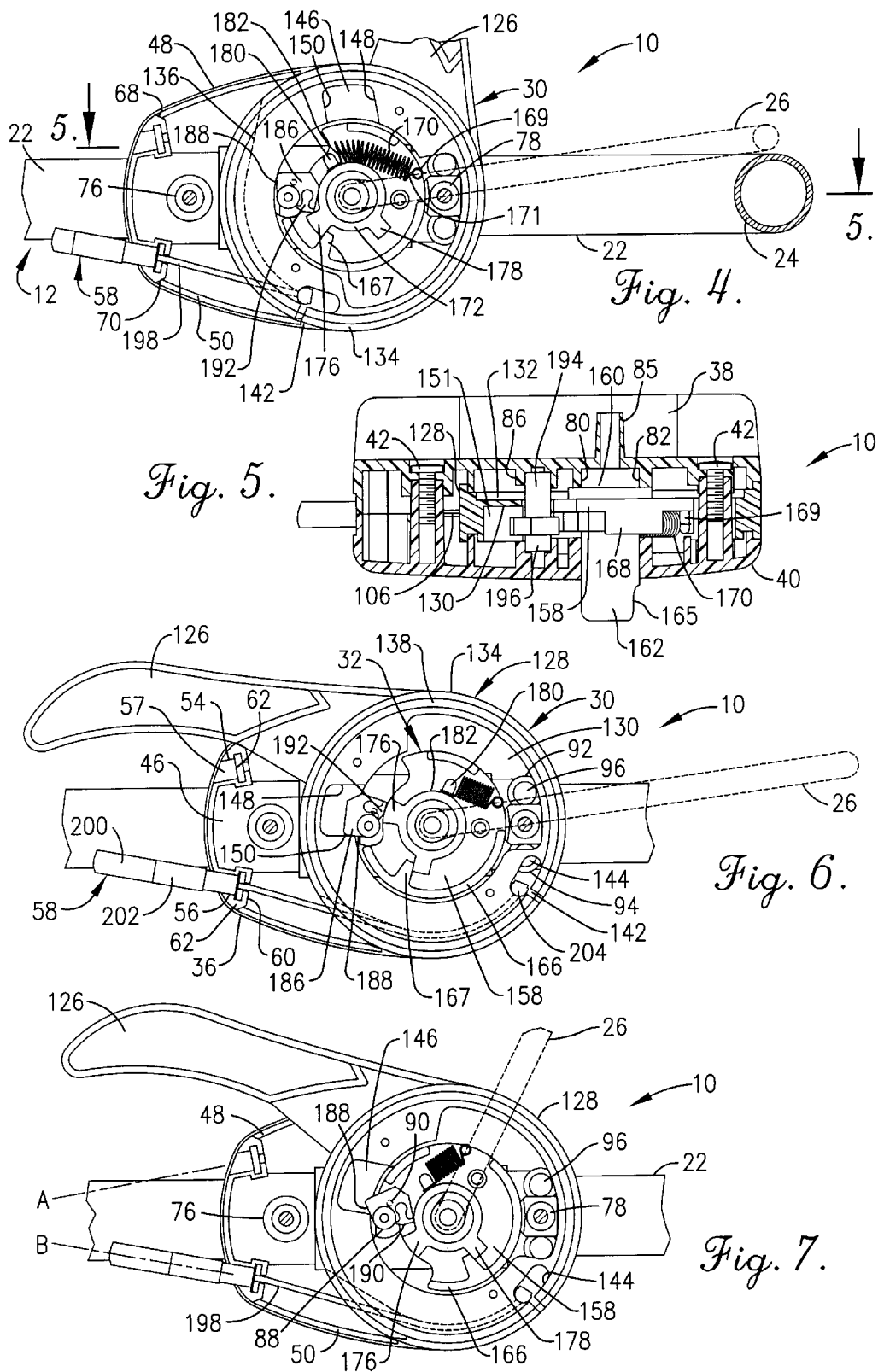

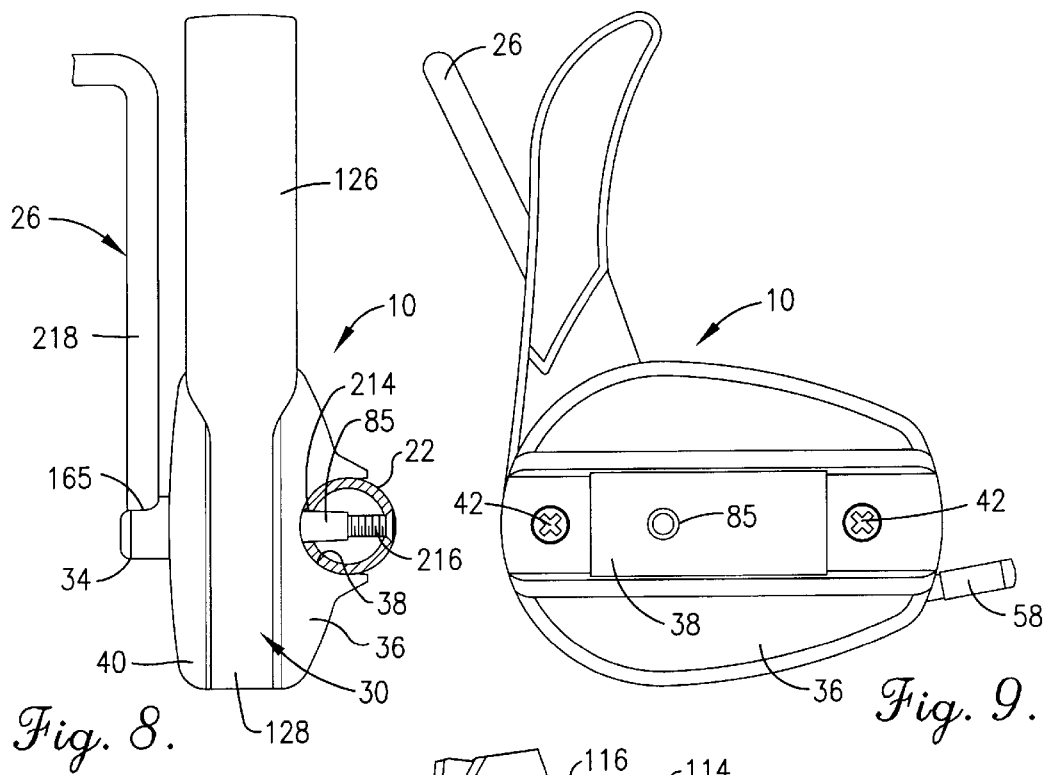
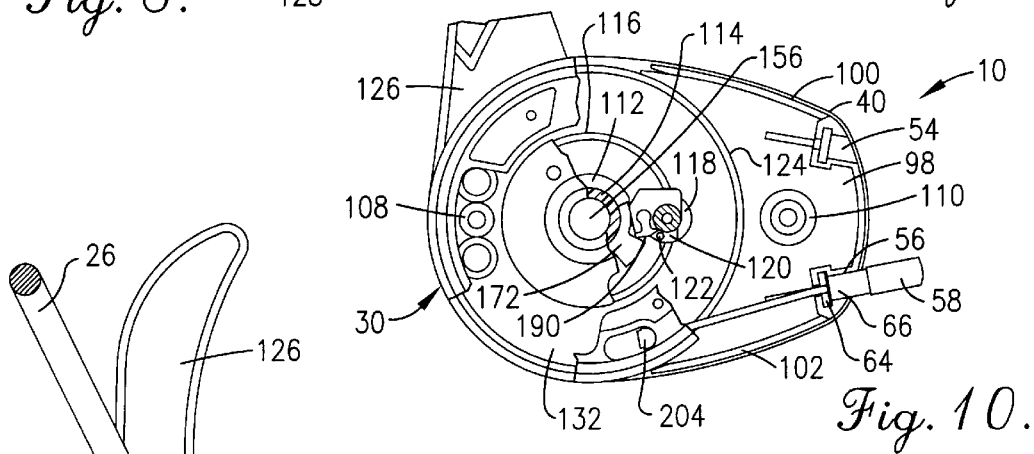
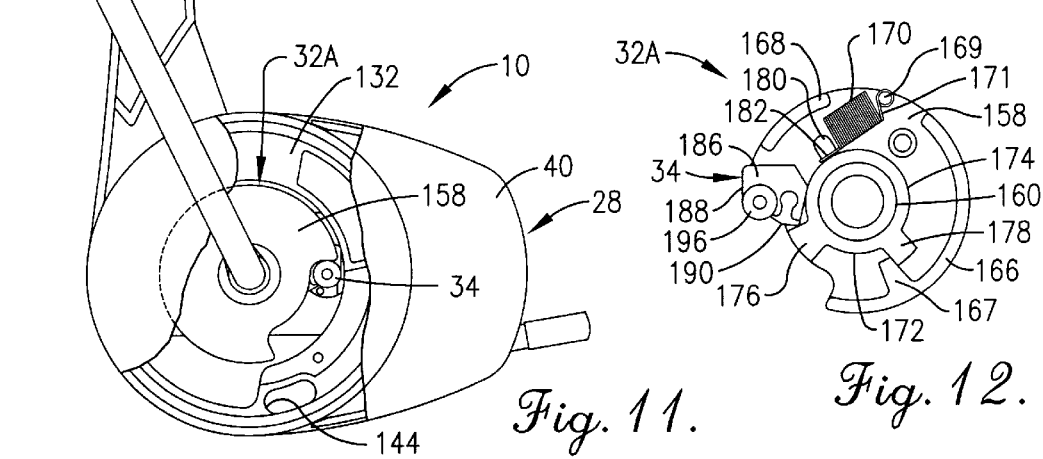

DUAL ACTION BAIL AND LEVER LAWN MOWER CONTROL ASSEMBLY

BACKGROUND OF THE INVENTION

1. Field of the Invention

This invention broadly concerns a control for a lawn mower which operatively interconnects a bail and a lever control. More particularly, it is concerned with a control assembly readily adaptable to either left or right hand mounting which causes the lever control to disengage when the bail is released.

2. Description of the Prior Art

Manufacturers are constantly looking for ways to make powered rotary lawn mowers safer, easer to use, and more economical. These lawnmowers generally include a lowermost housing supported on spaced wheels with a gasoline powered engine coupled to a rotary mower blade disposed within the housing, with the engine also optionally coupled to the lawnmower wheels for powered propulsion thereof. The lawnmower is guided by a U-shaped handle extending rearwardly from the housing so that the user, when the ground drive is engaged, merely guides the mower in a "walk-behind" mode of operation.

The lawnmowers are provided with controls which operate the throttle, ground drive and blade engagement features. In addition, the mowers may have speed ranges or gearboxes which drive the mower at different ground speeds at the same throttle setting when the ground drive is engaged. The mowers typically have safety bails which are mounted on the handles of the walk-behind lawnmowers. When the bail is grasped, an engine brake or clutching-type mechanism is moved to permit the blade to rotate. The bail is spring-loaded and operate in a "deadman" fashion whereby the blade, and preferably the ground drive engagement, is stopped when the user releases the bail. The bail are positioned for grasping by the user only when in the desired operating position. As a result, a typical cable control device for lawnmowers must be capable of coupling with one end of a control cable and of coupling with the deadman handle. Known prior art devices such as that disclosed in Carlson U.S. Pat. No. 4,428,160, however, have tended to be bulky in order to accommodate all the required mechanical functions. The control lever in Barnard, et al., U.S. Pat. No. 4,936,160, incorporated herein by reference, presents an improvement, but has some of the cable coupling components extending outside the body, and which includes locking pawls particularly configured for mounting only on the right hand side of the handle. In addition, that control did not provide a capability for handling two control cables as well as cooperation between the ground drive cable and bail.

As these features have been added to the lawnmower, new controls have been added for each feature. The number of control cables and controls for each feature have increased the complexity of the mower, increased the number of parts required, and necessitated that the operate independently operate a number of separate mechanisms. Lawnmower manufacturers must maintain separate parts for each feature, and find mounting locations on the handle for each control. Furthermore, if a control is to be mounted on the left side of the handle, a mirror image of the control needed to be manufactured if it was mounted on the right side of the handle, with corresponding expenses for molds and inventory.

SUMMARY OF THE INVENTION

The dual action control of the present invention largely meets these needs by providing cooperative action between the bail and the lever controlling the cable interior to the control along with the capability of mounting in either a left-hand or right hand position using only one alternative left hand or right hand part. The control assembly hereof utilizes the tension applied to the remote end of the control cable for the ground drive to bias the lever to a disengaged position unless manually overcome by the operator and then held by a blocking pawl within the body of the control. The body is preferably provided with two separate channels for receiving the control cable therethrough, and a longitudinally extending recess generally centrally positioned along one side for receiving a tubular portion of the handle.

The dual action control includes a shiftable operating lever mounted for pivotal movement relative to a supporting body. The body also pivotally mounts a bail socket which connects with a bail carried by the handle. The bail socket includes a retainer shiftably carried on a socket post and a retainer spring. A pawl is pivotally carried within the body for shifting between a disengaged position and an position in which a portion of the pawl is engaged within a recess provided in the interior wall of the operating lever. When the bail swings into position toward a cross-member on the handle, the bail socket is rotated therewith and the retaining spring biases the pawl toward the engaged position. Thereafter, with the operating lever shifted from a first position (drive not engaged) to a second position (drive engaged), the recess is shifted until it is adjacent the pawl and the pawl shifts into the engaged position. When the bail is released or moves a predetermined amount, the retainer and retainer spring no longer bias the pawl into engagement with the recess of the lever. As a result, the drive engagement spring coupled to the remote end of the operating cable is free to move the control wire because the pawl no longer holds the control lever against movement. The lever then returns to its first position as the control wire shifts to permit disengagement of the ground drive.

Advantageously, the dual action control of the present invention includes only eight parts plus the operating cable and mounting screws, and seven of the eight parts are used in either a right handed or left handed mounting configuration. The only part not common to either configuration is the bail socket which is reconfigured to permit the bail to be positioned in its desired position on top of the handle and to properly engage the pawl, with the shaft extending through the housing to receive the bail. By repositioning the remaining parts within the two halves of the body, the dual action control hereof can be used in the same manner to hold or permit disengagement of the ground drive in either a right hand or a left hand mode.

BRIEF DESCRIPTION OF THE DRAWINGS

FIG. 1 is a right side elevation view illustrating a walk-behind lawn mower mounting the dual action bail and lever assembly hereof in a right-hand configuration;

FIG. 2 is a side view of the control assembly hereof with the left half of the housing removed and the safety bail shown in dotted lines;

FIG. 3 is a horizontal cross-sectional view along line 3—3 of FIG. 2 of the assembly hereof showing the position of the spindle, pawl and bail socket within the housing with the bail in the upright and non-engaged position;

FIG. 4 is a side view similar to FIG. 2 showing the assembly hereof with the bail and bail socket pivoted to the engaged position and the shift lever in the unengaged, upright position;

FIG. 5 is a horizontal cross sectional view taken along line 5—5 of FIG. 4 showing the position of the bail socket and retainer in engagement with the pawl when the bail is pulled back but the ground drive is not engaged;

FIG. 6 is a side view similar to FIG. 4 showing the assembly hereof with the bail pulled back and the ground drive engaged to illustrate the lug of the retainer blocking movement of the pawl to hold the shift lever in position;

FIG. 7 is a side view similar to FIG. 6, showing the assembly hereof with the bail released and the bail socket moving to permit the pawl to shift and allow the control wire to move and return the shift lever to its original position shown in FIG. 2;

FIG. 8 is a rear elevational view of the control assembly hereof in the right hand mounted position shown in FIGS. 1 through 7 with the bail and shift lever in a non-engaged position;

FIG. 9 is a left side elevational view thereof;

FIG. 10 is a vertical cross sectional view taken substantially along line 10—10 of FIG. 3, with a portion of the shift lever broken away to show the pawl;

FIG. 11 is a left side elevational view of an alternate embodiment of the control assembly hereof, with a portion of the housing broken away to show a left hand design of the bail socket, and wherein the pawl and housing halves have been rearranged for mounting to the opposite side of the handle to that illustrated in FIG. 1; and FIG. 12 is a right side elevational view of the left hand design bail socket of the alternate configuration of FIG. 11, showing the engagement of the pawl with the lug of the bail socket.

DESCRIPTION OF THE PREFERRED EMBODIMENTS

Referring now to the drawing, FIG. 1 shows a dual action bail and lever lawn mower control assembly 10 in the right-hand configuration of the present invention mounted on a lawn mower 12 having a housing 14, an engine 16 mounted on the housing 14 and operatively coupled to a rotary blade positioned within the housing 14 for rotating in a generally horizontal cutting plane, a ground drive 18 for selectively operatively connecting the engine to either front or rear driving wheels, and a handle 20 for guiding and positioning the lawnmower 12. The handle 20 extends generally rearwardly from the housing 14 and includes a pair of tubular rails 22 interconnected at their rearward ends by a crossbeam 24 for gripping by the operator during use. A safety bail 26 is provided for engagement of the ground drive in the dual action assembly 10 and preferably also operatively coupled to a blade brake or clutching device for stopping the blade when the bail is not drawn against the crossbeam 24.

The dual action control assembly hereof broadly includes a housing 28, a shift lever 30, a bail socket 32 and a blocking pawl 34. The housing 28 has a first half 36 provided with a longitudinally extending recess 38 for mounting to one of the rails 22 and a second half 40 for mounting to the first half 36 with the shift lever, bail socket and blocking pawl 34 held therebetween. The first half 36 is preferably secured to the second half using screws 42 shown in FIGS. 5 and 9.

The first half 36, shown in FIGS. 2, 4, 6 and 7 includes a base wall 44 presenting a longitudinally extending ridge 46 which is convex on the interior as seen in FIGS. 2, 4, 6 and 7 and concave on the exterior to provide recess 38. Sills 48 and 50 extend interiorly from the base wall 44 to forward wall 52 which presents channels 54 and 56 for the passage of a control cable 58 therethrough, best seen in FIG. 2. Each channel 54 and 56 presents a cavity 57 including a back wall 60 and a partition wall 62 for holding rim 64 of a collar 66 of the control cable 58 therebetween. The channels 54 and 56 each present longitudinal axes, A and B respectively, which intersect the circular body 128 of the shift lever 30 and are generally parallel to lines extending tangentially therefrom. The axes A and B are intersecting. Forward wall 52 is slightly taller than sills 48 and 50 to present shoulders 68 and 70. A circular bearing guide wall 72 extends generally interiorly and away from base wall 44 and defines the pivot axis of the shift lever 30 as the center of the bearing guide wall 72. A shelf 74 extends around the outside of the bearing wall 72 around the rear periphery of the first half 36.

Aligned longitudinally along the ridge 46 are screw receivers 76 and 78 through which screws 42 pass. A hub 80 extends interiorly from ridge 46 for rotatably receiving bail socket 32 therein and includes a substantially circular hub wall 82 surrounding a socket stem receiver 84. A locating projection 85 extends from the exterior side of the socket stem receiver 84 into the recess 38 as shown in FIG. 3 to inhibit longitudinal movement of the assembly 10 relative to the rail 22 to which the assembly 10 is mounted. A pawl socket 86 is located forwardly of the hub 80 and presents reverse C-shaped (as seen in FIG. 7) collar 88 and a pawl limit pin 90, shown in phantom in FIG. 2. The pawl limit pin 90 does not engage the pawl in the orientation shown in FIG. 2, but as will explained below, engages an opposing pin in the second half 40, and when the internal components are rearranged to provide a left-hand mounting, the limit pin 90 does engage the pawl 34. A resilient elastic cylindrical stop 96 of rubber or the like is received in one of tubes 92 and 94 adjacent receiver 78.

Second half 40 of housing 28 is shown in FIG. 10 and is complementally configured to first half 36. The second half 40 includes a base wall 98 with sills 100 and 102 projecting inwardly and oriented opposite sills 48 and 50. A forward wall 104 extends interiorly slightly more than sills 100 and 102 so that a gap 106 is presented between the opposing sills 48 and 100 and also 50 and 102. The forward wall 104 also is configured with channels 54 and 56 as described above to receive the control cable 58 therethrough. Two internally threaded posts 108 and 110 are sized and positioned to receive screws 42 therein and to extend into receivers 76 and 78 respectively. A bail socket bearing 112 has a hole 114 therethrough and extends interiorly from base wall 98. A substantially circular raised ring 116 is located radially outwardly from socket bearing 112 and extends interiorly from base wall 98 substantially the same distance as bail socket bearing 112. The ring 116 is interrupted at approximately its forward end by a pivot pin receiver 118 presenting a collar 120 and limit pin 122. The limit pin 122 is preferably positioned directly opposite the limit pin 90, with either limit pin 90 or 122 performing the purposes explained hereinafter depending on the configuration of the control as either a left hand or right hand control. A second circular bearing guide wall 124 is positioned radially outwardly from ring 116 and is raised inwardly from base wall 98 slightly higher than ring 116 and socket bearing 112.

Shift lever 30 presents an extended graspable handle 126 and a generally circular body 128, and has an access side 130 shown in FIGS. 2, 4, 6 and 7 and a closed side 132 partially shown in FIG. 10. A circular band 134 extends circumferentially around the outside of the body 128 and has a groove 136 positioned midway there across. An access side circular track 138 is located radially inwardly and depressed relative to band 134 as shown in FIG. 2, and a corresponding closed side circular track 140 is located radially inwardly and depressed relative to band 134 as shown in FIG. 10. The track 134 is complementally configured to mate with bearing guide wall 124, while track 138 is complementally configured to mate with bearing guide wall 72.

Access side 130 of body 128 also the presents a slot 142 extending through the band 134 and track 138 and extends to groove 136. The body 128 also defines therein an opening 144, whereby the slot 142 serves to connect the groove 136 with the opening 144. Body 128 has a recess 146 including blocking shoulders 148 and 150 open to access side 130, the recess interrupting the interior retaining wall 151 which extends in an arcuate path opposite blocking pawl 34. An inside face 152 is positioned radially interiorly of track 138 and raised relative thereto.

The bail socket 32 includes a transversely extending shaft 154 which is tubular to surround a bail receiving opening 156, and a plate 158 oriented in a plane generally normal to the axis of the shaft 154. The shaft 154 has a short stub shaft portion 160 and a long spindle portion 162 extending from opposite sides of plate 158. The long spindle portion 162 also presents a cutout 165 at the remote end thereof to engage the bail 26 and cause the bail socket 32 to rotate with the bail 26. The plate 158 includes a perimeter wall 166 having stop indentation 167 and a margin wall 168 extending substantially normal to the plate 158. A spring anchor 169 also extends normally from plate 158 and holds one end 171 of coil spring 170. A retainer 172 is carried on the long spindle portion 162 and includes a circular ring 174 for pivotal movement of the retainer on the spindle portion 162, a lug 176, a foot 178 and a spring attachment finger 180, which is coupled to the other end 182 of coil spring 170.

Blocking pawl 34 is pivotally received within the pawl socket 86 and the pivot pin receiver 118 and includes pivot pin 184 and blocking element 186. The blocking element presents blocking surface 188 and retaining surface 190, preferably positioned approximately 90° from one another. The retaining surface is preferably provided with a friction resistant margin 192 of nylon, Delrin or other synthetic resin to avoid deformation of the lug 176 during engagement therewith. The pivot pin presents a long pin portion 194 received in pawl socket 86 in the left hand orientation shown in FIGS. 1–10 and a short pin portion 196 extending transversely from blocking element 186 and received in pivot pin receiver 118 in that left-hand configuration.

Control cable 58 is preferably a conventional Bowden conduit having an inner control cable 198, and an outer sheath 200. The sheath 200 carries collar 66 at its proximate end 202 mounted within one of channel 54 or 56. The inner control cable 198 is provided with an enlarged head 204 its proximate end for positioning within opening 144 to couple the head 204 to the body 128 of shift lever 30. The remote end 206 of the control cable 198 is provided with a tension spring 208 and secured to the ground drive 18 of the lawnmower 12 to compensate for stretching of the control cable 198. A return spring 210 is provided as a part of or connected to the ground drive actuating element 212 to bias the ground drive 18 to return to a disengaged position.

FIGS. 11 and 12 illustrate the dual action bail and lever lawn mower control assembly 10 hereof in a reversed, or left hand mounting configuration. The only new part necessary is a reconfigured bail socket 32A. In this configuration, for mounting to the rail extending on the right side of the mower (the opposite rail 22 to that shown in FIG. 1), the components may be largely retained. For proper orientation and a comparison with FIGS. 8 and 9, the shift lever 30 is retained with the handle 126 in the upright position by reorienting the position of cutout 165 to maintain the bail 26 to remain above the handle 20 once mounted and in use, and reversing the positions of long spindle portion 162 and short stub shaft portion 160 of the shaft 154. The retainer 172 is then rotatably mounted on the short stub shaft portion 160 so that the lug 176 is properly oriented for engagement with pawl 34. The first half 36 and second half 40 of the housing 28 are inverted and their positions exchanged. The blocking pawl 34 is reversed so that its short pin portion 196 is received into pawl socket 86 and its long pin portion is received in pivot pin receiver 118. In this configuration, the inversion of the housing 28 results in the control cable 58 being located in channel 54 and aligned along axis A, whereas in the right hand mounting configuration the cable 58 is located in channel 56 and aligned along axis B.

In operation, with the dual action bail and lever lawn mower control assembly mounted in the right hand configuration shown in FIGS. 1–10, the housing 28 is mounted with the rail 22 received in the recess 38, and the locating projection 85 inserted into a hole 214 in the rail 22 and secured by a self-tapping screw 216 as shown in FIG. 8. The safety bail 26 is inserted into the bail receiving opening 156 of long spindle portion 162 so that the upright extending portion 218 of the bail 26 is received in the cutout 165. Typically, the bail 26 must be pulled down against the crossbeam 24 of the handle 20 in order to start the engine 16 of the lawnmower 12 under current safety regulations. By pulling the bail 26 down from the position shown in FIGS. 1 and 2 to the position shown in FIG. 4, the bail socket 32 rotates in a clockwise direction as may be seen in a comparison of FIGS. 2 and 3. However, the retainer 172 is prevented from rotating with bail socket 32 because its lug 176 engages retaining surface 190 of blocking element 186, which is in turn engaged by retaining wall 151. The retaining wall 151 thus prevents the blocking pawl 34 from pivoting, and as a result, the spring 170 is tensioned as the bail socket 34 rotatably shifts relative to the retainer 172. Tensioning of the spring 170 in turn applies a biasing force to the retainer 182 and through its lug 176 to the pawl 34 to pivot in a counterclockwise direction.

When the operator desires to engage the ground drive 18 so that the lawnmower 12 is self-propelled, he moves the handle 126 forward to the position shown in FIG. 6. As the handle 126 moves forward, the circular body 128 rotates in a circular path defined by the engagement between the tracks 138 and 140 and their respective bearing guide walls 124 and 72. The rotation of the body 128 continues until the recess 146 is positioned opposite the blocking element 186 of pawl 34. The recess 146 is a discontinuance in the retaining wall 151 and this permits the lug 176 of retainer to pivot the blocking element 186 under the influence of the force applied by spring 170. As shown in FIG. 6, this pivoting movement of the pawl 34 positions the blocking element 186 in the recess 146 with the blocking surface engaging the blocking shoulder 150 of the body 128 and the lug 176 engaging the retaining surface 190 of the blocking element 186 to prevent pivoting of the pawl 34 in a clockwise direction. The operator may the release the handle 126 and as long as the bail is grasped, the shift lever 30 is prevented from moving in a clockwise direction as seen in FIGS. 1, 2, 4, 6 and 7. Stop indentation 167 engages the foot 178 of the retainer 172 and prevents movement of the lug 176 beyond a blocking position, as well as always maintaining a small amount of tension on the spring 170. The counterclockwise movement of the shift lever causes the control wire 198, received in groove 136, to be tensioned as shown in a comparison of FIGS. 2 and 4, and as a result, shifts the actuating element 212 and tensions return spring 210.

When the operator releases the bail 26, which is connected to control cable 220 which is spring-loaded at the end thereof remote to the bail 26, the cable 220 shifts the bail to the upright position shown in FIGS. 1, 2, 8, 9 and 11, the blocking pawl 34 pivots in a counterclockwise direction and thus moving the lug 176 out of opposition to retaining surface 190 of pawl 34. The tensioned return spring 210 thus causes actuating element 212 to move under its influence and pull on control wire 198. As control wire 198 moves within its sheath, it imparts a force to the shift lever 30 causing body 128 to move in a clockwise direction. As shown in FIG. 7, because the pawl 34 is now free to pivot in a clockwise direction because the opposition of lug 176 has been removed, the shoulder 150 pushes against blocking surface 188 and pivots the blocking element 186 out of engagement with the recess 146. Shift lever 30 then pivots to return to the position shown in FIG. 2. The return spring 210 at the remote end 206 of the control cable 198 thus provides the force for shifting the control lever 30 once the bail 26 is raised to remove the blocking element 186 which impeded the shifting of the actuating element 212 because of its connection to the shift lever 30 through the control cable 58.

The operation of the control assembly 10 hereof when provided in a left-hand configuration and blocking pawl 34A is substituted for blocking pawl 34 is in all respects the same, except that the direction of pivoting of the components is reversed, dependent upon the orientation from which the elements are viewed. Thus, the retainer 172 rotates in a counterclockwise direction to shift the blocking element 186 of pawl 34 into the recess 146 when viewed from a position between the rails 22 as shown in FIG. 11, and in a counterclockwise direction when viewed from the left hand side of the lawnmower 12 and outside the rails as shown in FIG. 12.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of their invention as pertains to any apparatus not materially departing from but outside the literal scope of the invention as set out in the following claims.

We claim:

1. A dual action bail and lever lawn mower assembly for mounting to a handle and coupling to a shiftable bail of a walk-behind lawn mower having a control cable having a first end and a second end connected to a ground drive, said assembly comprising:

a control cable operatively connected to said ground control, said control cable including a sheath presenting a collar and a control wire shiftably received within said sheath, said control wire presenting a first end and a second end operatively coupled with said ground drive;

a housing;

a shift lever having a substantially circular body received in said housing for pivotal movement therewithin, said body including an arcuate retaining wall defining a recess therein, said body being coupled to the first end of the control cable;

a bail socket coupled to the bail for shifting therewith, said bail socket including a spindle extending through said body for pivoting thereabout and a retainer shiftably received on said spindle, said retainer including a lug thereon; and a pawl pivotally mounted in said housing for engagement by said lug for movement between engagement with said retaining wall and receipt in said recess, said housing presenting first and second channels each presenting a longitudinal axis, each of said axes extending toward said circular body and including a wall for retaining said collar against movement of said sheath relative to said housing.

2. A control assembly as set forth in claim 1, wherein each of said axes is oriented substantially parallel to a line extending tangentially from said circular body.

3. A control assembly as set forth in claim 2, wherein said axes are non-parallel.

\* \* \* \* \*